United States Patent
Kim et al.

(10) Patent No.: US 8,789,418 B2
(45) Date of Patent: Jul. 29, 2014

(54) INERTIAL SENSOR AND ANGULAR VELOCITY DETECTION METHOD USING THE SAME

(75) Inventors: Jong Woon Kim, Seoul (KR); Liwei Lin, San Ramon, CA (US); Minyao Mao, Santa Rosa, CA (US); Won Kyu Jeung, Seoul (KR)

(73) Assignee: Samsung Electro-Mechanics Co., Ltd., Gyunggi-Do (KR)

( * ) Notice: Subject to any disclaimer, the term of this patent is extended or adjusted under 35 U.S.C. 154(b) by 0 days.

(21) Appl. No.: 13/591,335

(22) Filed: Aug. 22, 2012

(65) Prior Publication Data

US 2013/0081465 A1    Apr. 4, 2013

(30) Foreign Application Priority Data

Sep. 29, 2011  (KR) .................. 10-2011-0099074

(51) Int. Cl.
*G01C 19/56*  (2012.01)
(52) U.S. Cl.
USPC ........................................ 73/504.12
(58) Field of Classification Search
USPC .......................... 73/504.12, 504.16
See application file for complete search history.

(56) References Cited

U.S. PATENT DOCUMENTS

| 4,750,364 A | * | 6/1988 | Kawamura et al. | ........ 73/504.16 |
| 7,246,520 B2 | * | 7/2007 | Eguchi et al. | .......... 73/504.16 |

FOREIGN PATENT DOCUMENTS

JP    2009-192400    8/2009

OTHER PUBLICATIONS

Office Action dated Dec. 20, 2012 for related Korean Patent Application No. 10-2011-0099074 and its English summary.

\* cited by examiner

*Primary Examiner* — John Chapman, Jr.
(74) *Attorney, Agent, or Firm* — Ladas & Parry, LLP

(57) ABSTRACT

Disclosed herein is an inertial sensor. The inertial sensor includes: a plurality of driving masses; support bodies connecting a connection bridge so as to support the driving masses; a connection bridge connecting the plurality of driving masses and connecting the plurality of driving masses with the support bodies; and an electrode pattern part including driving electrodes simultaneously driving the driving masses and sensing electrode detecting axial Coriolis force of each of the driving masses.

5 Claims, 3 Drawing Sheets

INERTIAL SENSOR AND ANGULAR VELOCITY DETECTION METHOD USING THE SAME

CROSS REFERENCE TO RELATED APPLICATION

This application claims the benefit of Korean Patent Application No. 10-2011-0099074, filed on Sep. 29, 2011, entitled "Inertial Sensor and Angular Velocity Detection Method Using the Same", which is hereby incorporated by reference in its entirety into this application.

BACKGROUND OF THE INVENTION

1. Technical Field

The present invention relates to an inertial sensor and an angular velocity detection method using the same.

2. Description of the Related Art

Recently, as a small and light inertial sensor using a MEMS technology is easily manufactured, applications of the inertial sensor have been expanded to home appliances including a mobile communication terminal beyond the existing market. Further, with the continuous development of a function of a sensor, the function of the sensor has been evolved from a uni-axis sensor capable of detecting only inertial force for a single axis using a single sensor to a multi-axis sensor capable of detecting inertial sensor for multi axes of bi-axis or more using a single sensor and the performance thereof tends to be improved.

As described above, there is a need to accurately and efficiently perform time division driving and control in order to detect multi-axis inertial force, that is, hexa-axis inertial force of a tri-axis acceleration and a tri-axis angular velocity using a single sensor.

In addition, in the case of the inertial sensor according to the prior art, in order to detect the tri-axis angular velocity using the single driving mass, X/Y-axial driving and Z-axial driving are sequentially driven in the time division manner and the Z-axial angular velocity and X and Y-axial angular velocity are sequentially detected.

As described above, as the inertial sensor is implemented in the time division manner for the tri-axis angular velocity detection using the single inertial sensor, there are problems in that a sampling rate may be reduced, a driving circuit may be very complicated, and additional current consumption for stopping and re-driving may be required.

SUMMARY OF THE INVENTION

The present invention has been made in an effort to provide an inertial sensor capable of detecting a tri-axis angular velocity without time division driving by connecting a plurality of driving masses, simultaneously driving the plurality of driving mass, and selectively vibrating the driving mass in an in-phase and an inverse phase with respect to each of the X-axis direction and a Z-axis direction of the driving mass, and an angular velocity detection method using the same.

According to a preferred embodiment of the present invention, there is provided an inertial sensor, including: a plurality of driving masses; support bodies connecting a connection bridge so as to support the driving masses; a connection bridge connecting the plurality of driving masses and connecting the plurality of driving masses with the support bodies; and an electrode pattern part including driving electrodes driving the driving masses in an inverse phase and sensing electrodes detecting axial Coriolis force of each of the driving masses.

The driving mass may include a first driving mass and a second driving mass having the same size and the first driving mass and the second driving mass may be connected with each other by the connection bridge.

The connection bridge may include: a coupling bridge connecting the plurality of driving masses; a first connection bridge connecting each of the plurality of driving masses with the support bodies in a first-axis direction; and a second connection bridge connecting each of the plurality of driving masses with the support bodies in a second-axis direction orthogonal to the first-axis direction.

The coupling bridge, the first connection bridge, and the second connection bridge may have the same thickness, a width of the first connection bridge may be formed to be larger than that of the second connection bridge, and a width of the second connection bridge may be formed to be larger than that of the coupling bridge.

The driving electrodes of the electrode pattern part may be formed at the connection bridges at both sides of the plurality of driving masses.

The sensing electrode of the electrode pattern part may include a first sensing electrode connecting the driving masses and formed at the connection bridge extending in the first-axis direction and a second sensing electrode formed at the connection bridge extending in a second axis direction extending in a direction orthogonal to the first-axis direction.

The first and second sensing electrodes may be adjacently formed to the driving masses in order to improve sensitivity.

According to another preferred embodiment of the present invention, there is provided an angular velocity detection method, including: simultaneously driving a plurality of driving masses; selectively vibrating the plurality of driving masses in an in-phase and an inverse phase with respect to X-axis and Z-axis directions of the plurality of driving masses; detecting in-phase component or inverse phase component of Y-axial Coriolis force by the X-axial in-phase or inverse phase vibration and detecting inverse phase or in-phase component of X-axial/Y-axial Coriolis force by the Z-axial inverse phase or in-phase vibration; and calculating Z-axial angular velocity $\Omega Z$ by the in-phase or inverse phase component of the Y-axial Coriolis force, calculating Y-axial angular velocity $\Omega Y$ by the inverse phase or in-phase component of the X-axial Coriolis force, and calculating X-axial angular velocity $\Omega X$ by the inverse phase or in-phase component of the Y-axial Coriolis force.

DESCRIPTION OF THE PREFERRED EMBODIMENTS

Figure 1:
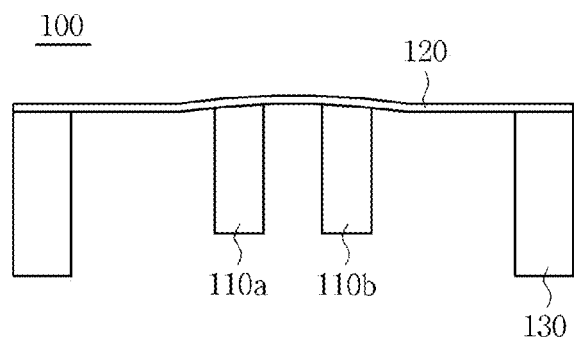
FIG. 1 is a schematic cross-sectional view of an inertial sensor according to a preferred embodiment of the present invention.

Various features and advantages of the present invention will be more obvious from the following description with reference to the accompanying drawings.

The terms and words used in the present specification and claims should not be interpreted as being limited to typical meanings or dictionary definitions, but should be interpreted as having meanings and concepts relevant to the technical scope of the present invention based on the rule according to which an inventor can appropriately define the concept of the term to describe most appropriately the best method he or she knows for carrying out the invention.

The above and other objects, features and advantages of the present invention will be more clearly understood from the following detailed description taken in conjunction with the accompanying drawings. In the specification, in adding reference numerals to components throughout the drawings, it is to be noted that like reference numerals designate like components even though components are shown in different drawings. Further, when it is determined that the detailed description of the known art related to the present invention may obscure the gist of the present invention, a detailed description thereof will be omitted.

Hereinafter, an inertial sensor according to preferred embodiments of the present invention will be described with reference to the accompanying drawings.

Figure 2:
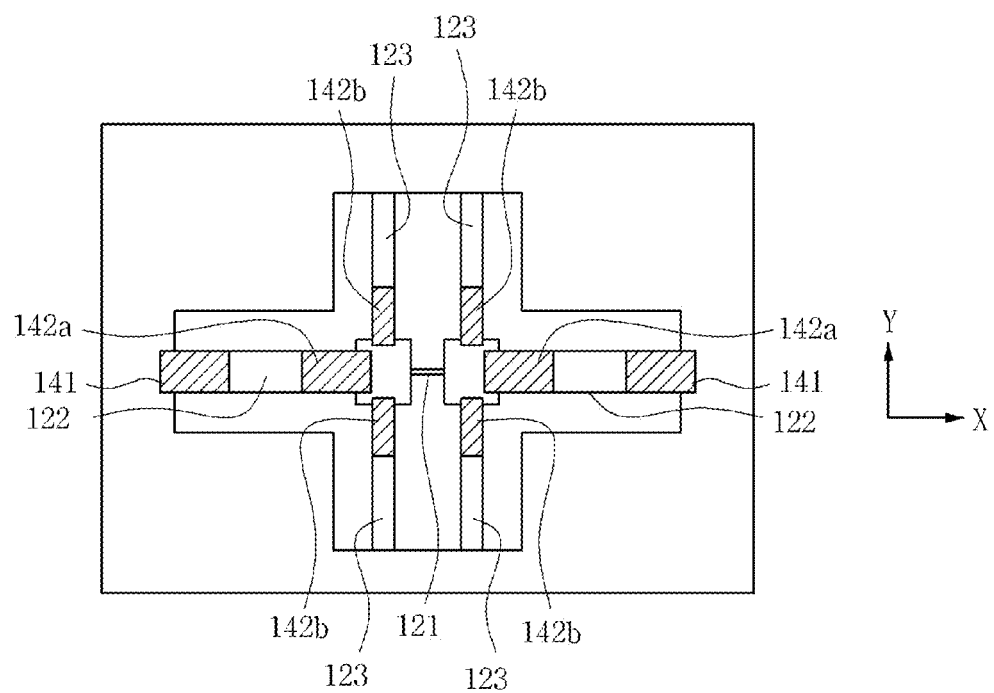
FIG. 2 is a schematic plan view of the inertial sensor shown in FIG. 1.

FIG. 1 is a schematic cross-sectional view of an inertial sensor according to a preferred embodiment of the present invention and FIG. 2 is a schematic plan view of the inertial sensor shown in FIG. 1. As shown, an inertial sensor 100 includes a plurality of driving masses 110a and 110b, a connection bridge 120, support bodies 130, and electrode pattern parts 141 and 142.

In more detail, the plurality of driving masses 110a and 110b are configured to include a first driving mass 110a and a second driving mass 110b having the same size and interwork with the connection bridges 121, 122, and 123.

Further, the connection bridges 121, 122, and 123 connect the plurality of driving masses 110a and 110b with each other and are to connect the plurality of driving masses 110a and 110b with the support bodies 130 and are configured to include a coupling bridge 121, a first connection bridge 122, and a second connection bridge 123.

In addition, the coupling bridge 121 connects the first driving mass 110a with the second driving mass 110b, the first connection bridge 122 connects each of the first driving mass 110a and the second driving mass 110b with the support bodies 130 in a first-axis direction, that is, an X-axis direction, and the second connection bridge 123 connects each of the first driving mass 110a and the second driving mass 110b with the support bodies 130 in a second-axis direction orthogonal to the first-axis direction, that is, a Y-axis direction.

Further, since the connection bridges 121, 122, and 123 are configured of a silicon on insulator (SOI) substrate, the coupling bridge 121, the first connection bridge 122, and the second connection bridge 123 have the same thickness. In addition, as shown, the coupling bridge 121 has the smallest width and the width the first connection bridge 122 is formed to be larger than that of the second connection bridge 123. That is, the width of the first connection bridge is formed to be larger than that of the second connection bridge and the width of the second connection bridge is formed to be larger than that of the coupling bridge. This is designed in consideration of the electrodes formed on each of the bridges and a role and an effect thereof.

Next, the support body 130 connects the connection bridge 120 so as to support the first driving mass 110a and the second driving mass 110b.

Further, the electrode pattern part is configured to include driving electrodes 141 and sensing electrodes 142. In addition, the driving electrodes 141 are formed at both sides of the first connection bridge 122 based on the driving mass 110 and vibrate the first and second driving masses 110a and 110b. In addition, the driving electrode 141 vibrates the first and second driving masses 110a and 110b so as to be simultaneously driven.

Further, the sensing electrode 142 detects Coriolis force in each axis direction of the first and second driving masses 110a and 110b. To this end, the sensing electrode 142 connects the first and second driving masses and is configured to include a first sensing electrode 142a formed at the first connection bridge 122 extending in a first-axis direction, that is, an X-axis direction and a second sensing electrode 142b formed at the second connection bridge 123 extending in a second direction orthogonal to the first-axis direction, that is, a Y-axis direction.

In addition, the first and second sensing electrodes 142a and 142b may be adjacently formed to the first and second driving masses 110a and 110b in order to improve sensitivity.

Further, in the inertial sensor according to the preferred embodiment of the present invention, the plurality of driving masses 110, the connection bridge 120, and the support body 130 may be integrally implemented on the silicon or the silicon on insulator (SOI) substrate by an etching process manner.

Figure 3:
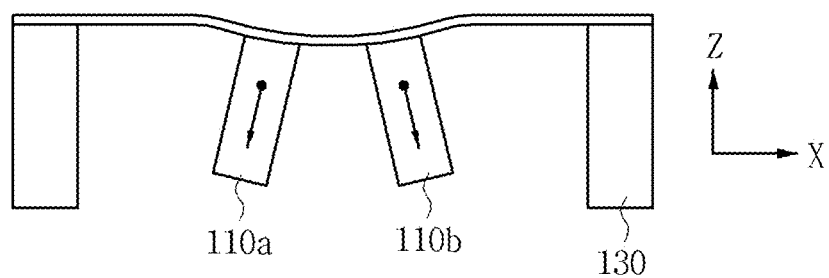
FIG. 3 is a schematic use status diagram of the inertial sensor according to a preferred embodiment of the present invention.

FIG. 3 is a schematic use status diagram of the inertial sensor according to a preferred embodiment of the present invention. As shown, in the inertial sensor 100, when the first and second driving masses 110a and 110b are vibrated by the driving electrode 141, the first and second driving masses 110a and 110b are simultaneously driven in the Z-axis and X-axis directions in the state in which the first and second driving masses 110a and 110b are connected to each other by the coupling bridge 121. Further, as shown in FIG. 3, the first and second driving masses 110a and 110b are driven so that free ends, that is, bottom ends thereof are far away from each other in the X-axis direction while top ends thereof fall in the Z-axis direction. Therefore, the first and second driving masses 110a and 110b are simultaneously driven in the Z-axis and X-axis directions as shown by an arrow.

Figure 4:
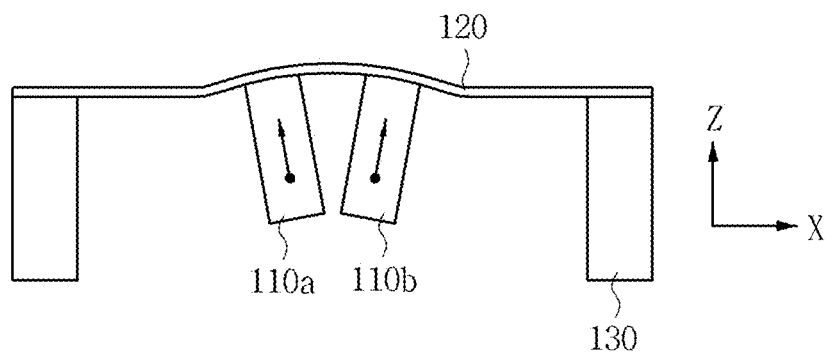
FIG. 4 is a schematic use status diagram of the inertial sensor according to the preferred embodiment of the present invention.

FIG. 4 is a schematic use status diagram of the inertial sensor according to a preferred embodiment of the present invention. As shown, in the inertial sensor 100, when the first and second driving masses 110a and 110b are vibrated by the driving electrode 141, the first and second driving masses 110a and 110b are simultaneously driven in the Z-axis and X-axis directions in the state in which the first and second driving masses 110a and 110b are connected to each other by the coupling bridge 121. Further, as shown in FIG. 4, the first and second driving masses 110a and 110b are driven so that the free ends, that is, the bottom ends thereof approaches to each other in the X-axis direction while the top ends thereof rise in the Z-axis direction. Therefore, the first and second driving masses 110a and 110b are simultaneously driven in the Z-axis and X-axis directions as shown by an arrow.

The driving electrode and the sensing electrode may also be attached to a piezoelectric element formed at the connection bridge so that the deformation of the connection bridge according to the displacement of the driving mass interacts with electrical driving/sensing signals.

Figure 5:
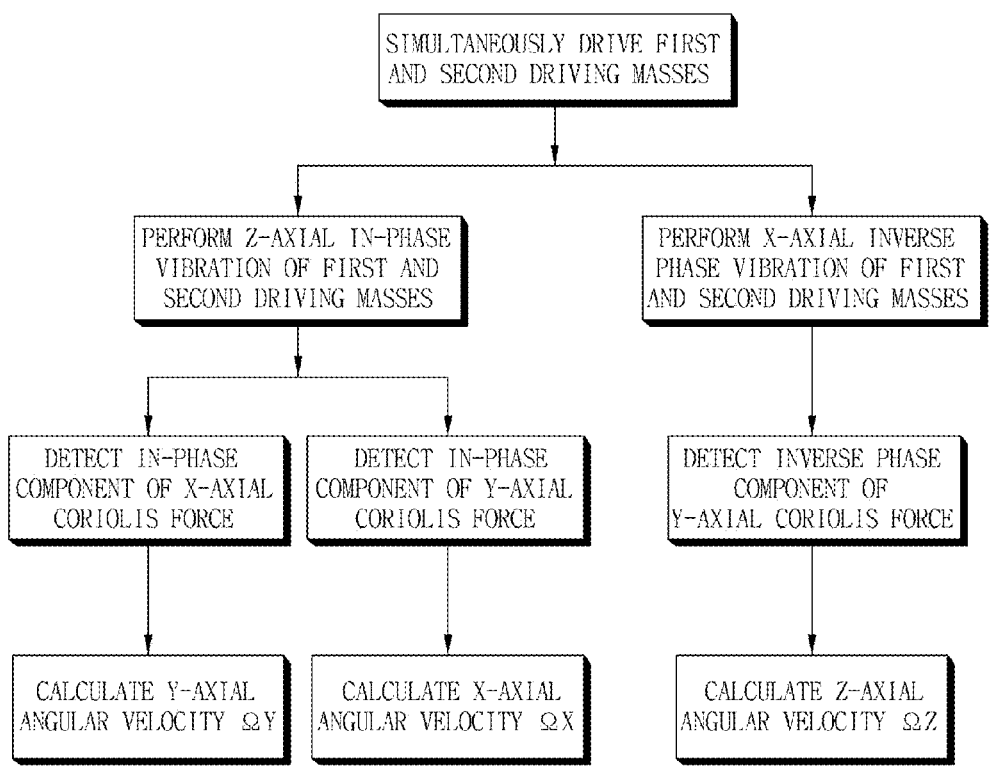
FIG. 5 is a flow chart schematically showing a method for sensing an inertial sensor according to the preferred embodiment of the present invention.

FIG. 5 is a flow chart schematically showing a method for sensing an inertial sensor according to the preferred embodiment of the present invention. As shown in FIG. 5, the method for sensing an inertial sensor simultaneously drives the first and second driving masses. Further, the first and second driving masses are vibrated in an in-phase and an inverse phase with respect to the Z axis and are vibrated in an inverse phase with respect to the X-axis direction.

Further, an in-phase component of X-axial Coriolis force is detected by the Z-axial in-phase vibration of the first and second driving masses and a Y-axial angular velocity (SW) is calculated by the in-phase component of X-axial Coriolis force.

Further, an in-phase component of Y-axial Coriolis force is detected by the Z-axial vibration of the first and second driving masses and an X-axial angular velocity ($\Omega Y$) is calculated by the in-phase component of Y-axial Coriolis force.

Further, an inverse phase component of Y-axial Coriolis force is detected by the X-axial inverse vibration of the first and second driving masses and an Z-axial angular velocity ($\Omega Y$) is calculated by the inverse phase component of Y-axial Coriolis force.

By the configuration described above, the inertial sensor according to the preferred embodiments of the present invention simultaneously drives the first and second driving masses to vibrate the first and second driving masses in the in-phase and the inverse phase with respect to the Z-axis and X-axis directions, thereby simultaneously sensing the X-axial angular velocity ($\Omega X$), the Y-axial angular velocity ($\Omega Y$), and the Z-axial angular velocity ($\Omega Z$) without the time division driving for each axis direction.

As set forth above, the preferred embodiments of the present invention can provide the inertial sensor capable of detecting the tri-axis angular velocity without the time division driving by connecting the plurality of driving masses, simultaneously driving the plurality of driving mass, and selectively vibrating the driving mass with respect to each of the X-axis direction and the Z-axis direction of the driving mass in an in-phase and an inverse phase, and an angular velocity detection method using the same.

Although the preferred embodiments of the present invention have been disclosed for illustrative purposes, they are for specifically explaining the present invention and thus an inertial sensor and an angular velocity detection method using the same according to the present invention are not limited thereto, but those skilled in the art will appreciate that various modifications, additions and substitutions are possible, without departing from the scope and spirit of the invention as disclosed in the accompanying claims.

Accordingly, any and all modifications, variations or equivalent arrangements should be considered to be within the scope of the invention, and the detailed scope of the invention will be disclosed by the accompanying claims.

What is claimed is:

1. An inertial sensor, comprising:
   a plurality of driving masses;
   a connection bridge connecting the driving masses;
   support bodies connecting the connection bridge so as to support the driving masses; and
   an electrode pattern part including driving electrodes simultaneously driving the driving masses and sensing electrode detecting Coriolis force of each of the driving masses,
   wherein the driving masses comprise a first driving mass and a second driving mass having the same size, and the first driving mass and the second driving mass are connected with each other by the connection bridge, and
   wherein the connection bridge comprises:
      a coupling bridge connecting the driving masses;
      a first connection bridge connecting each of the driving masses with the support bodies in a first-axis direction; and
      a second connection bridge connecting each of the driving masses with the support bodies in a second-axis direction orthogonal to the first-axis direction.

2. The inertial sensor as set forth in claim 1, wherein the coupling bridge, the first connection bridge, and the second connection bridge have the same thickness, a width of the first connection bridge is formed to be larger than that of the second connection bridge, and a width of the second connection bridge is formed to be larger than that of the coupling bridge.

3. The inertial sensor as set forth in claim 1, wherein the driving electrodes of the electrode pattern part are formed at the connection bridge at both sides of the plurality of driving masses.

4. The inertial sensor as set forth in claim 1, wherein the sensing electrode of the electrode pattern part includes a first sensing electrode connecting the driving masses and formed at the first connection bridge extending in the first-axis direction and a second sensing electrode formed at the second connection bridge extending in a second axis direction extending in a direction orthogonal to the first-axis direction.

5. The inertial sensor as set forth in claim 4, wherein the first and second sensing electrodes are adjacently formed to the driving masses in order to improve sensitivity.

* * * * *